United States Patent [19]

Seto

[11] Patent Number: 4,809,114
[45] Date of Patent: Feb. 28, 1989

[54] MAGNETIC DISC CARTRIDGE

[75] Inventor: Kunihira Seto, Kanagawa, Japan

[73] Assignee: Fuji Photo Film Co., Ltd., Kanagawa, Japan

[21] Appl. No.: 218,517

[22] Filed: Jul. 6, 1988

Related U.S. Application Data

[62] Division of Ser. No. 911,038, Sep. 24, 1986, abandoned.

[30] Foreign Application Priority Data

Sep. 24, 1985 [JP]  Japan .................. 60-144172[U]

[51] Int. Cl.$^4$ ............................................. G11B 23/02
[52] U.S. Cl. ...................................................... 360/133
[58] Field of Search ........................... 360/133, 130.34; 206/444, 312, 313

[56] References Cited

U.S. PATENT DOCUMENTS

| | | | |
|---|---|---|---|
| 4,436,201 | 3/1984 | Inabi | 206/444 |
| 4,510,546 | 5/1982 | Asami et al. | 360/133 |
| 4,620,247 | 10/1986 | Papciak et al. | 360/133 X |
| 4,672,499 | 6/1987 | Oishi et al. | 360/133 |
| 4,695,910 | 9/1987 | Maruyama et al. | 360/133 |

Primary Examiner—John H. Wolfe
Attorney, Agent, or Firm—Sughrue, Mion, Zinn, Macpeak, and Seas

[57] ABSTRACT

A magnetic disc cartridge has a lifter supported by a wall of the disc cartridge. The lifter has a riser for pressing a liner or liners against a disc sheet rotatably supported in the disc cartridge. The pressing force B/A of the riser is at least 0.6, where A equals the pressing force of the riser which is measured at ordinary temperature and humidity during an initial period when the lifter is combined with the cartridge, and B is the pressing force of the riser which is measured at ordinary temperature and humidity after the cartridge has been held at a temperature of 60° C. and a humidity of 80% for seventy-two hours.

2 Claims, 1 Drawing Sheet

MAGNETIC DISC CARTRIDGE

This is a division of application Ser. No. 911,038 filed Sept. 24, 1986, now abandoned.

BACKGROUND OF THE INVENTION

1. Field of the Invention

This invention relates to a magnetic disc cartridge which accommodates a disc-shaped thin magnetic recording medium, namely, a disc sheet in such a manner that the disc sheet is rotatably supported in the cartridge, and more particularly to a magnetic disc cartridge in which the disc sheet surface cleaning means is improved.

2. Conventional Means

A floppy disc has been proposed in the art as is well known. The floppy disc is manufactured by forming magnetic layers on both sides of a disc-shaped substrate of flexible polyester sheet or the like, so that signals are magnetically recorded on the magnetic layers with a magnetic head while the disc is being rotated. As the floppy disc can be handled with ease and can be manufactured at relatively low cost, it is extensively employed as a recording medium for computers.

A variety of floppy discs have been put to practical use. One example of a floppy disc is a so-called "magnetic disc cartridge" which has been devised in such a manner that a hard case is employed to positively protect the disc sheet and thereby improve reliability. In addition, an opening, through which the magnetic head is brought into contact with the disc sheet, is formed in the hard case and is provided with a slidable shutter in order to protect the disc sheet and to prevent the entrance of dust into the cartridge.

In a magnetic recording medium of this type, a liner is interposed between the disc sheet and the case inner wall confronting the disc sheet. The liner is made of unwoven cloth such as rayon, polyester or the like. The liner is softly brought into contact with the disc sheet while the disc sheet is rotated to clean the disc sheet of fine particles such as dust.

A rectangular lifter made of polyethyleneterephthalate (PET) film is disposed between the liner and the inner wall. The lifter has a fixing part at one end which is secured to the case inner wall, and the remaining part of the lifter is a riser which raises obliquely upwardly to elastically push the liner upwardly. That is, the liner is uniformly brought into contact with the surface of the disc sheet by the lifter so that the disc sheet will be sufficiently cleaned.

In the conventional lifter, the riser and the fixing part are formed by mechanically bending a flat material. As the lifter is secured in the form of a cantilever to the case inner wall, stress due to external force is concentrated at the base of the riser. Furthermore, as the riser is bent in its entirety, when it is used for a long period, it becomes settled. As a result, its pressing force is decreased so that it becomes impossible to sufficiently abut the liner against the disc sheet; that is, the cleaning effect of the liner is gradually decreased.

Especially in the case where the aforementioned magnetic disc cartridge is used for a long period of time, the cartridge may be held at high temperature (usually 50° C. to 60° C.) by the heat generated by the device into which the cartridge is loaded or the frictional heat generated by the rotation of the disc sheet. In the case where the cartridge is stored at high temperature and at high humidity, settling of the lifter made of synthetic resin is expedited, and the elastic force of the lifter is substantially lost. Furthermore, because of the permanent set in fatigue of the lifter, the running torque of the disc sheet is decreased, and it is difficult to maintain the running torque stable.

If the initial pressing force is made large in expectation of the settling of the lifter, then the load of the running torque of the disc sheet is excessively large. The difficulty that the lifter becomes settled may be eliminated by employing a metal lifter; however, use of the metal lifter results in another problem that it is rather difficult to manufacture the metal lifter when compared with the lifter of plastic resin. Magnetic disc cartridges having lifters are described in Japanese early utility model publications Nos. 58-30973, 58-35183, and 60-6939.

SUMMARY OF THE INVENTION

In view of the foregoing, an object of this invention is to provide a magnetic disc cartridge having a lifter which is so improved that it is substantially free from the permanent set in fatigue caused with the lapse of time or that caused by high temperature, and performs its original function positively.

The foregoing object and other objects of the invention have been achieved by the provision of a magnetic disc cartridge which accommodates a disc sheet in such a manner that the disc sheet is rotatable and comprises liners kept in contact with the disc sheet, and a lifter pressing the liners against the surfaces of the disc sheet; in which, according to the invention, the lifter is made of a plastic film having a riser which is fixedly secured to a case inner wall at one end, and rises obliquely with a predetermined angle, and the riser has a pressing force maintaining rate B/A of at least 0.6, where A is the pressing force of the riser which is measured at ordinary temperature and at ordinary humidity during an initial period when the lifter is combined with the cartridge, and B is the pressing force of the riser which is measured at ordinary temperature and at ordinary humidity after the cartridge has been held at a temperature of 60° C. and at a humidity of 80% for seventy-two hours.

BRIEF DESCRIPTION OF THE INVENTION

The foregoing objects, features and advantages of the invention and other objects, features and advantages of the invention will be apparent with reference to the following detailed description and the accompanying drawings in which.

DETAILED DESCRIPTION OF THE INVENTION

One embodiment of this invention will be described with reference to the accompanying drawings.

Figure 1:
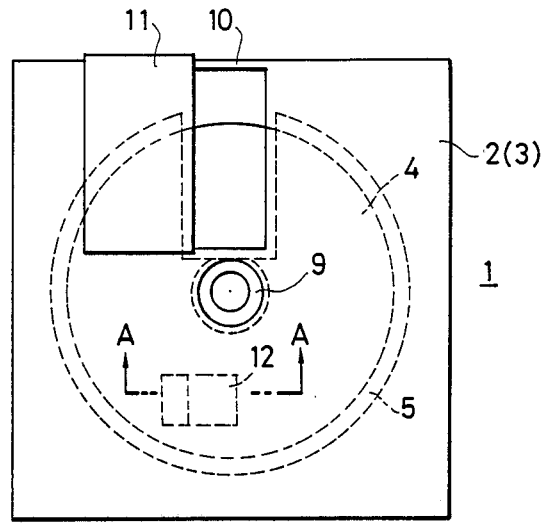
FIG. 1 is a plan view outlining a magnetic disc cartridge, according to the invention.
Figure 2:
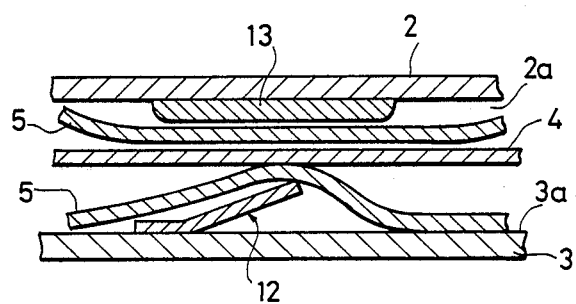
FIG. 2 is an enlarged sectional view taken along line A—A in FIG. 1.
Figure 3:
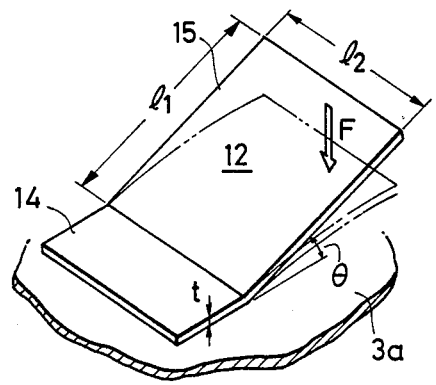
FIG. 3 is a perspective view of the lifter shown in FIG. 2.

In the accompanying drawings, FIG. 1 is a plan view outlining a magnetic disc cartridge according to an embodiment of the invention, FIG. 2 is an enlarged sectional view taken along line A—A of FIG. 1, and FIG. 3 is an enlarged perspective view of a lifter according to the invention.

The magnetic disc cartridge 1, as shown in FIG. 1, is formed by an upper half 2 and a lower half 3 which can be made of relatively hard plastic resin. The upper half 2 and the lower half 3 form a case which accommodates: a magnetic recording medium, namely, a disc sheet 4; liners 5 of unwoven cloth or the like for protecting and cleaning the disc sheet 4; and a lifter 12 for abutting the liners 5 against the surfaces of the sheet 4 under suitable pressure. The disc sheet 4 has a center core 9 at the center which is held by the rotating means of the signal recording and reproducing unit. The center core 9 appears outside of the case. The case has a rectangular opening 10 so that a magnetic head of a signal recording and reproducing unit can be brought into slidable contact with the sheet surface. The case also has a slidable dust-proof shutter 11 for closing the opening 10 when the cartridge is not in use.

The liners 5 are disposed on upper and lower surfaces of the disc sheet 4, respectively. Each of the liners 5 is in the form of a substantially annular disc which covers substantially the entire recording surface of the sheet 4. As is apparent from FIG. 2, the inner wall 2a of the upper half 2 is confronted with the inner wall 3a of the lower half 3 on which the lifter 12 is provided. A protrusion or a plurality of ribs 13 arranged in parallel with a tangent to the disc sheet 4 and radially with respect to the disc sheet 4, similar to as in the conventional magnetic disc cartridge, are provided on the inner wall 2a of the upper half 2 in such a manner as to facilitate the action of the lifter 12 (FIG. 2).

The lifter 12 is a rectangular plate-shaped member as shown in FIG. 3. The lifter 12 has a fixing part 14 at one end, and the remaining part is a riser 15. The fixing part 14 is secured to the inner wall 3a of the lower half 3. The riser 15 rises obliquely so as to form an angle $\theta$ with the disc sheet. The lifter 12 is made of plastic resin such as polycarbonate, polysulfone, polyimide or polyallylate.

The lifters 12 were made of the above-described materials, and the pressing forces of the lifters 12 thus made were measured under the following conditions. The results of the measurements are as indicated in the following Table 1, which includes comparison examples also. In each of the lifters 12, the length $l_1$ of the riser was 19 mm ($l_1$=19 mm) and the width $l_2$ of the riser was 20 mm ($l_2$=20 mm), and the rise angle $\theta$ was 12° ($\theta$=12°). The thicknesses of the lifters 12 were as indicated in Table 1.

In Table 1, with respect to the pressing forces of the risers 15, A is the force (unit: g) provided when the riser is bent as indicated by the broken line in FIG. 3 at ordinary temperature (25° C.) and at ordinary humidity (a relative humidity of 65%) during the initial period when the lifter 12 is combined with the magnetic disc cartridge, and B is the force (unit: g) provided when, after the cartridge has been held for 72 hours at a temperature of 60° C. and a relative humidity of 80%, the temperature is changed to ordinary temperature and the humidity is also changed to ordinary humidity. Further in Table 1, B/A is the pressing force maintaining rate.

TABLE 1

| Lifter material | Thickness (um) | Pressing force A (g) | Pressing force B (g) | Pressing force maintaining rate (B/A) |
| --- | --- | --- | --- | --- |
| Polysulfone | 150 | 2.4 | 2.1 | 0.89 |
| Polyimide | 125 | 2.3 | 2.0 | 0.87 |
| Polycarbonate | 150 | 1.7 | 1.4 | 0.82 |
| Polyallylate | 130 | 2.0 | 1.5 | 0.76 |

TABLE 1-continued

| Lifter material | Thickness (um) | Pressing force A (g) | Pressing force B (g) | Pressing force maintaining rate (B/A) |
| --- | --- | --- | --- | --- |
| Triacetate (Comparison example) | 125 | 1.6 | 0.1 | 0.06 |
| Polystyrene (Comparison example) | 130 | 1.9 | −0 | −0 |
| Polyethyleneterephthalate (Comparison exaxple) | 125 | 3.0 | 1.0 | 0.33 |

Initial pressing force A is determinative by material, thickness, and bending angle of the lifter as shown in Table 2. The ratio B/A would be substantially the same if the material of the lifter would be the same. That is, it is necessary to select suitable materials in order to provide optimum B/A ratio.

TABLE 2

| Lifter material | Thickness (um) | Bending angle (g) | Pressing force A(g) | Pressing force B(g) | B/A |
| --- | --- | --- | --- | --- | --- |
| polycarbonate | 150 | 9° | 1.3 | 1.1 | 0.85 |
| polycarbonate | 150 | 12° | 1.7 | 1.4 | 0.82 |
| polycarbonate | 200 | 12° | 3.7 | 3.0 | 0.81 |
| polyethyleneterephthalate | 125 | 9° | 2.2 | 0.8 | 0.36 |
| polyethyleneterephthalate | 125 | 12° | 3.0 | 1.0 | 0.33 |
| polyethyleneterephthalate | 75 | 12° | 0.8 | 0.3 | 0.37 |

Incidentally, even if the material, thickness and bending angle are the same, B/A ratio would be slightly changed by a bending condition of the lifter. This change is due to moderation of residual strain at the bending portion. Therefore residual strain should be removed in order to stabilize the ratio of B/A.

As is apparent from Table 1, the pressing force maintaining rate (B/A) of each of the lifter 12 made of the above-described materials according to the invention is more than 0.7. On the other hand, the pressing force maintaining rates (B/A) of the comparison examples are considerably less.

The fact that the lifter 12 according to the invention is large in pressing force maintaining rate means that the lifter 12 is scarcely settled, and the lifter 12 functions sufficiently for a longer period of time.

In the above-described embodiment, the lifter 12 is of cantilever type; however, the invention is not limited thereto or thereby. For instance, the lifter 12 may be so modified that the riser is triangular in side view, and its two ends on the bottom side are fixed; that is, the lifter 12 may be of so-called "both-end support type".

As was described above, the pressing force maintaining rate of the lifter according to the invention is maintained large, which prevents the difficulty that the running torque of the disc sheet is made unstable by the permanent set in fatigue of the lifter. Furthermore, as the lifter of the invention is made of plastic resin or the like, it can be more readily manufactured than a lifter of metal. Thus, in the magnetic disc cartridge according to the invention, the lifter is stable in operation for a long period.

I claim:

1. A method of forming a magnetic disc cartridge having a disk sheet with a lower surface, comprising the following steps:
   - providing a first and second wall on opposing sides of said disk sheet, said first wall facing said lower surface of said disk sheet;
   - supporting said disk sheet between said first and second walls;
   - providing a lower liner for contacting said lower surface of said disk sheet;
   - providing a lifter supported by said first wall; and
   - providing a riser for causing said lower liner to contact said lower surface of said disk sheet with a pressing force, said riser having a pressing force maintaining rate B/A of at least 0.6, where:
   - A is the pressing force of said riser which is measured at a first temperature and at a first humidity during when said lifter is combined with said cartridge, said first temperature being equal to 25° C. and said first humidity being equal to 65%, and
   - B is the pressing force of said riser which is measured at said first temperature and at said first humidity after said cartridge has been held at a second temperature and a second humidity for 72 hours, said second temperature being equal to 60° C. and second humidity being equal to 80%.

2. A method for insuring a prolonged life of a lifter in a magnetic cartridge comprising the following steps:
   - measuring a first pressing force (A) of said lifter at a first temperature and a first humidity when said lifter is combined with said cartridge, said first temperature being 25° C. and said first humidity being 65%;
   - holding said cartridge at a second temperature and a second humidity for seventy-two hours, said second temperature being 60 deg. C. and said second humidity being 80%;
   - measuring a second pressing force (B) of said lifter after said cartridge has returned to said first temperature and said first humidity; and
   - determining a pressing force maintaining rate (B/A) by computing a ratio of said second pressing force (B) to said first pressing force (A), and selecting those lifters which exhibit a pressing force maintaining rate (B/A) of at least 0.6.

* * * * *